July 6, 1954
G. WHITE
2,682,768
FLIGHT LIMIT INDICATOR
Filed Dec. 10, 1952
2 Sheets-Sheet 1
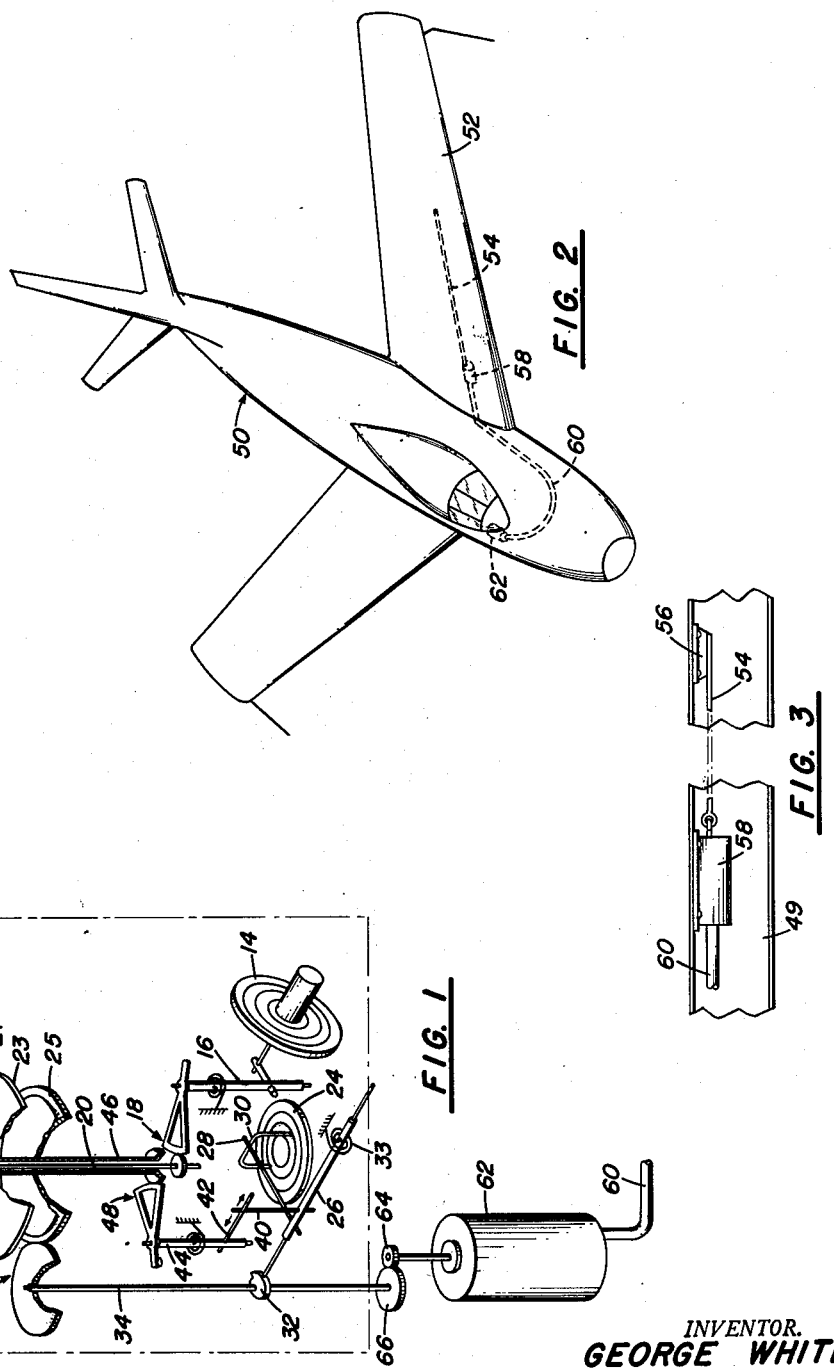
INVENTOR.
GEORGE WHITE
BY
Walter S. Paul.
ATTORNEY Patented July 6, 1954

2,682,768

UNITED STATES PATENT OFFICE 2,682,768

FLIGHT LIMIT INDICATOR

George White, Phoebus, Va.

Application December 10, 1952, Serial No. 325,243

7 Claims. (Cl. 73—88.5)

(Granted under Title 35, U. S. Code (1952), sec. 266)

The invention described herein may be manufactured and used by or for the Government of the United States of America for governmental purposes without the payment of any royalties thereon or therefor.

This invention relates to improvements in aircraft instruments of the type used to inform the pilot during flight of his position within the structural flight limitations of the aircraft, and is a continuation of Ser. No. 250,940, filed on October 11, 1951, now abandoned.

It has been customary in the design of low-speed airplanes to define an envelope of structural design conditions by means of a diagram known as a V—n diagram. Such a diagram consists of a set of curves of acceleration normal to the flight path plotted against velocity, a typical example of which is shown in Fig. 4. The left-hand portion of this curve is defined by the maximum lift which can be attained at a given velocity; the upper horizontal line is specified arbitrarily in accordance with the intended use of the airplane; and the vertical line at the right-hand side is specified with consideration of the capabilities of the airplane and its intended use. It is readily apparent that the pilot, with the use of an accelerometer having a mark at the maximum safe acceleration and an airspeed indicator having a mark at the maximum safe airspeed, can easily see at a glance whether or not his airplane is approaching an envelope condition and can thereby insure safe operation.

With the advent of design speeds approaching the speed of sound, it was found that compressibility effects made necessary an alteration in shape of the V—n diagram. High acceleration at high speeds was found to cause buffeting or a reduction in lift coefficient so that it became impossible to fly safely in the upper right-hand corner of the envelope. Similarly, high angles of attack at lower speeds caused buffeting, which made it inadvisable to fly in the upper left-hand corner of the envelope. This, in effect, altered the shape of the V—n diagram to that of the dotted curve of Fig. 4. Furthermore, it was found that this curve could be more accurately represented as a curve of wing lift coefficient versus Mach number, in this form being sometimes known as the "Buffet boundary curve," a typical example of which is shown in Fig. 5. It can be seen that now the pilot no longer has a single limit acceleration and a single limit airspeed, but the safe limits of acceleration and speed become interdependent. Thus, in order to safely utilize the full maneuverability of the airplane it would be necessary for him to continuously refer to a diagram and ascertain that for a given speed at any instant the safe acceleration was not exceeded. Such a procedure would occupy so much of the pilot's time that it is impracticable during rapid maneuvering. As a result, somewhat less than optimum utilization of the airplane's strength is usually accepted and a single limit Mach number is established for the pilot's guidance.

Since the bending stress in the wing structure is substantially a function of lift coefficient, a measurement of the strain in wing members can be used to obtain an indication of the lift coefficient.

Also, inasmuch as Mach number is, for practical purposes, a function of airspeed and altitude, the motion derived from an aneroid capsule measuring static pressure can be used to indicate limit Mach number in terms of airspeed.

An important object of this invention is to provide means by which the pilot of an airplane can instantaneously and easily be informed of the approach to or existence of an unsafe combination of lift coefficient and Mach number.

Another object of the invention is to provide a means for continuously correlating the strain of a structural member of an airplane with the Mach number at which the airplane is flying and indicating such correlation to the pilot.

A further object of the invention is to furnish in an airspeed indicator a variable limit pointer whose position is a function of altitude and structural strain.

Other objects and features will become apparent in following the description of the illustrated form of the invention.

In the drawings:

Figure 1 is a schematic view of the flight limit indicator.

Figure 2 is a perspective view of a typical aircraft provided with the flight limit indicator.

Figure 3 is a fragmentary elevational view of a wing beam of the aircraft, showing the manner of attachment of a part of the strain-measuring device.

Figure 4:
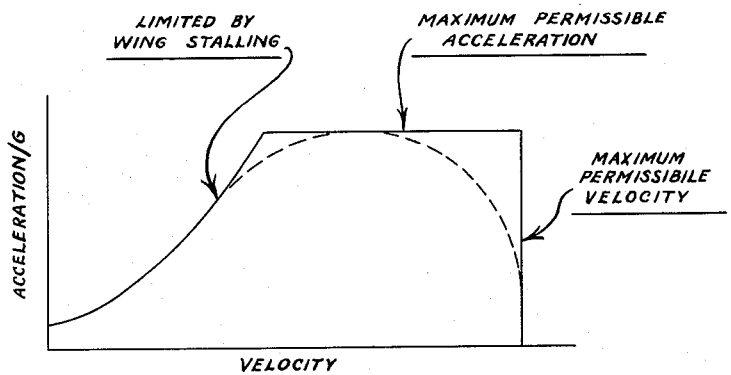
Figure 4 is a typical example of a V—n diagram showing limiting conditions of velocity and acceleration for a typical aircraft, the solid curve being representative of conditions for design of a low-speed airplane, and the dotted curve illustrating modifications made necessary when airplane design speeds approach the speed of sound.
Figure 5:
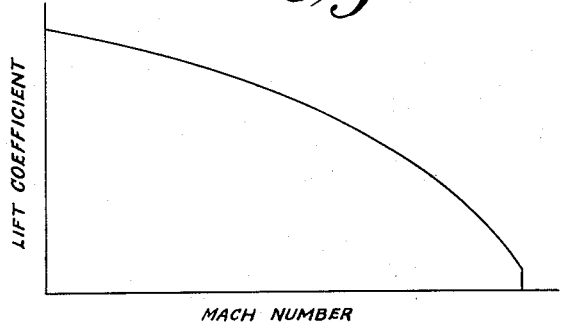
Figure 5 is an example of the "buffet boundary" curve showing limiting conditions of Mach number and lift coefficient for a typical high-speed airplane.

The objects of the invention are accomplished by providing an instrument having two pointers suitably mounted with reference to a dial calibrated to show airspeed in convenient units, one of such pointers to show indicated airspeed by means of a conventional dynamic pressure operated airspeed indicator mechanism, and the other pointer to show safe limit airspeed through the use of a mechanism combining motions derived from wing stress measurement and static pressure measurement, said pointers to be made easily distinguishable one from the other by differences in color, shape, or other suitable means.

In the drawings, the airspeed indicator element or pointer 10 is fixed to shaft 20 which is driven by the expansion and contraction of aneroid capsule 14 through spindle 16 and gear sector 18 so that for any given dynamic pressure in the aneroid capsule, the pointer 10 will bear the proper relationship to markings 22 on fixed dial 23 to show indicated airspeed, dial 23 being mounted concentrically with but not attached to hollow shaft 46.

The limit pointer 12 is fixed to hollow shaft 46, which is in turn connected to aneroid capsule 24 through a motion transmitting means including frame 30, lever 28 contacting it and contacting lever 40 that slidably contacts a lever 42, the latter being fixed to spindle 44 having gear sector 48 secured thereto. Hollow shaft 46 is further connected to the strain measuring device, represented by block 56 connected to beam 49 and rod 54, through a suitable transmission system. A typical system includes selsyn transmitter 58 carried by beam 49, cable 60 extending therefrom and operatively connected selsyn receiver 62, the latter imparting rotation to shaft 34 by means of enmeshed gears 64 and 66 secured to receiver 62 and shaft 34. Cam 32 on shaft 34 engages an end of shaft 26 to move it axially in response to cam rotation, thus moving lever 40 with respect to spindle 44 and its lever 42, the mechanical connection between spindle 44 and hollow shaft 46 being gear sector 48 and pinion secured to spindle 44 and hollow shaft 46.

As a convenience to the pilot, but not to be considered an essential part of the invention, there is provided window 27 in dial 23 through which may be seen markings on rotatable sub-dial 25 indicating the critical Mach number at the then prevailing value of wing lift coefficient. This is accomplished by rotating sub-dial 25 with respect to dial 23 by means of shaft 34 and gear 36, sub-dial 25 being mounted concentrically with but free to rotate about hollow shaft 46.

In operation, then, with airplane 50 flying at a safe speed in normal unaccelerated flight, airspeed pointer 10 will show indicated airspeed on dial 23, with limit pointer 12 lying at some value of airspeed safely above that shown by airspeed indicator pointer 10. If the altitude of the airplane is then increased with no change in lift coefficient, change in position of the movable side of aneroid capsule 24 due to pressure change will cause motion of frame 30, thereby rotating lever 28 about the axis of its shaft 26 and causing lever 40 to move lever 42, rotating spindle 44 and gear sector 48. This in turn would cause the rotation of hollow shaft 46 and move limit pointer 12 to a lower value of airspeed corresponding to the critical Mach number at the higher altitude. During this process, since wing lift has remained constant, shaft 34 has remained fixed, so that the critical Mach number seen in window 27 has remained constant.

If now the pilot increases the wing lift by manipulating the airplane controls, lift on wing 52 is increased, causing additional bending stress in wing beam 49. The change in stress results in relative motion between beam 49 and the free end of unstressed rod 54 which is transmitted by the selsyn transmitter 58, cable 60, and selsyn receiver 62 to cause rotation of gears 64 and 66. This produces rotation of shaft 34 and cam 32. Due to the shape of the face of cam 32 bearing against the end of shaft 26, rotation of cam 32 causes axial movement of shaft 26, thus changing the point of contact of lever 40 on lever 42.

Since the movement of shaft 26 and lever 40 is not exactly parallel to the surface of lever 42, the movement of lever 40 lengthwise along lever 42 without rotation about the axis of shaft 26, such rotation being prevented by lever 28 sliding along frame 30, results in the rotation of shaft 44, gear sector 48, and hollow shaft 46. This in turn moves limit pointer 12, to a lower value of airspeed on dial 23 corresponding to the lower critical Mach number which results from the increased lift. At the same time, rotation of shaft 34 has caused rotation of sub-dial 25 through gear 36, thus indicating through window 27 the new lower value of critical Mach number.

Thus, it is seen that the pilot can, by quickly noting the relative positions of airspeed pointer 10 and limit pointer 12, determine how closely he has approached the safe limits of airspeed and lift coefficient. He can then, by controlling his airspeed and normal force in such a manner as to keep the pointers separated, safely utilize to the fullest extent the structural strength of the airplane in performing any required maneuvers.

As various possible changes may be made in the form, construction, and arrangement of the parts without departing from the invention or sacrificing the advantages thereof, it is to be understood that all matter herein set forth is to be interpreted as illustrative and not in a limiting sense. For example, a rotating dial could be attached to shaft 46 replacing pointer 12, the dial being merely marked off in "Safe" and "Danger" zones. Moreover, a warning light, flag, horn etc. to give a single indication when a dangerous flight condition exists could be used in place of pointers and the like.

What is claimed is:

1. In an aircraft instrument having two pointers, means for rotating one of said pointers to show indicated airspeed, and means for rotating the second of said pointers as a function of altitude to show safe limit airspeed; the combination comprising a device for sensing the strain in a structural member of the wing, means responsive to sensed strain for transmitting a motion proportional to the magnitude of such strain, and means for transmitting said motion to the means for rotating said second of aforesaid pointers so that motion of said second pointer is such a function of altitude and structural strain that said second pointer will show safe limit airspeed for all values of altitude and wing lift.

2. In an aircraft instrument having two movable indicating elements, means for moving one of said elements in proportion to indicated airspeed and means for moving the second of said elements in proportion to altitude; the combination comprising a device for sensing strain in an aircraft wing structural member, means responsive to sensed strain for transmitting a motion proportional to the magnitude of such strain, means for transmitting said motion to said means for moving the second of aforesaid movable indicating elements and superimposing it thereon so that motion of said second element is proportional to both altitude and structural strain, and so that position of one of said elements relative to the other of said elements is an indication of the existing margin of safety between indicated airspeed and the safe limit airspeed for the existing conditions of altitude and wing lift.

3. In an aircraft instrument having a pointer and means for rotating the pointer to show Mach number; the combination comprising a second pointer mounted concentrically with but free to rotate independently of said first pointer, atmospheric pressure responsive means operatively connected to the second pointer to rotate it, a device for sensing the strain in a structural member of the wing of the aircraft, means responsive to sensed strain for transmitting a motion proportional to the magnitude of such strain, and means for applying said motion to said second pointer rotating means so that the position of said second pointer will show safe limit Mach number for the existing wing lift.

4. In an aircraft instrument having one movable indicating element and means for moving said element in proportion to Mach number; the combination comprising a second movable indicating element and atmospheric pressure responsive means to move said second element, a device for sensing the strain in a structural member of the aircraft wing, means responsive to sensed strain for transmitting a motion proportional to the magnitude of such strain, and means for transmitting said motion to said second movable indicating element moving means so that the position of one of said elements relative to the other of said elements is an indication of the existing margin of safety between existing Mach number and safe limit Mach number for the existing wing lift.

5. In an aircraft instrument having a pointer and means for rotating the pointer to show airspeed, the combination comprising a second pointer mounted concentrically with but free to rotate independently of said first pointer, atmospheric pressure responsive actuating means connected to the second pointer, means for sensing strain in a structural member of the wing, means responsive to sensed strain for transmitting a motion proportional to the magnitude of such strain, and means for transmitting said motion to said second pointer operating means so that the position of said second pointer will show safe limit airspeed for the existing wing lift.

6. In an aircraft instrument, an airspeed indicator, a limit indicator to provide information of a safe flight limit and adapted to be positionally compared with said airspeed indicator, cooperating means responsive respectively to ambient atmospheric pressure and the strain of a structural element of the aircraft, for actuating said limit indicator, said means comprising a strain sensing element secured to an aerodynamically stressed part of the aircraft, a motion transmitting mechanism responsive to the sensed strain, a pressure responsive device, and means operatively connected to said pressure responsive device and said motion transmitting mechanism for combining the motion of both and applying the resultant to said limit indicator.

7. In an aircraft instrument, an airspeed indicator, a limit indicator to provide information of a safe flight limit and adapted to be positionally compared with said airspeed indicator, a pressure responsive device and mechanism for transmitting a motion thereof to said limit indicator, a strain sensitive element connected to an aerodynamically stressed aircraft part, and means responsive to the sensed strain and connected with said mechanism for varying the amount of motion applied to said limit indicator from said pressure responsive device.

References Cited in the file of this patent

UNITED STATES PATENTS

| Number | Name | Date |
|---|---|---|
| 2,424,511 | Stanley et al. | July 22, 1947 |
| 2,538,303 | Findley | Jan. 16, 1951 |